United States Patent
Klaus et al.

(10) Patent No.: US 6,543,221 B1
(45) Date of Patent: Apr. 8, 2003

(54) DEVICE FOR STABILIZING THE FLOW IN THE EXHAUST LINE OF AN INTERNAL COMBUSTION ENGINE

(75) Inventors: Benedikt Klaus, Neusaess (DE); Andreas Mayr, Meitingen (DE); Alois Ullmer, Augsburg (DE)

(73) Assignee: Zeuna-Staerker GmbH & Co. KG, Augsburg (DE)

( * ) Notice: Subject to any disclaimer, the term of this patent is extended or adjusted under 35 U.S.C. 154(b) by 13 days.

(21) Appl. No.: 09/696,876

(22) Filed: Oct. 26, 2000

Related U.S. Application Data

(63) Continuation of application No. PCT/EP99/05716, filed on Aug. 7, 1999.

(30) Foreign Application Priority Data

Aug. 26, 1998 (DE) .......................... 198 38 703

(51) Int. Cl.⁷ .................................. I01N 7/00
(52) U.S. Cl. ............................. 60/324; 60/280
(58) Field of Search ................ 60/280, 324, 299

(56) References Cited

U.S. PATENT DOCUMENTS

| | | | | |
|---|---|---|---|---|
| 3,751,921 A | * | 8/1973 | Blomberg et al. | 60/324 |
| 3,964,875 A | * | 6/1976 | Chang et al. | 138/42 |
| 3,984,207 A | * | 10/1976 | Abthoff et al. | 60/299 |
| 4,002,433 A | * | 1/1977 | Oser | 60/299 |
| 4,182,120 A | | 1/1980 | Niebylski | |
| 4,529,356 A | | 7/1985 | Ciccarone | |
| 4,689,952 A | * | 9/1987 | Arthur et al. | 60/313 |
| 4,825,652 A | * | 5/1989 | Curran | 60/324 |
| 5,103,641 A | * | 4/1992 | Maus et al. | 60/299 |
| 5,150,573 A | * | 9/1992 | Maus et al. | 60/299 |
| 5,758,497 A | * | 6/1998 | Frederiksen et al. | 60/29 |
| 5,758,500 A | * | 6/1998 | Sumser et al. | 60/602 |
| 5,979,507 A | * | 11/1999 | Kojima et al. | 60/275 |

FOREIGN PATENT DOCUMENTS

| | | | | |
|---|---|---|---|---|
| DE | 31 20 212 | | 12/1982 | |
| DE | 3414537 | | 11/1984 | |
| DE | 3441284 | | 7/1985 | |
| JP | 0119907 | * | 9/1980 | 60/324 |
| JP | 09 264128 | | 10/1997 | |

\* cited by examiner

*Primary Examiner*—Thomas Denion
*Assistant Examiner*—Diem Tran
(74) *Attorney, Agent, or Firm*—Katten Muchin Zavis Rosenman

(57) ABSTRACT

A device for stabilizing the flow in the exhaust pipe of an internal combustion engine, in particular, at the outlet on the exhaust side of an exhaust turbocharger fitted downstream of an internal combustion engine, comprises a guide baffle (3, 8), which, in turn, comprises a plurality of web plates (6) extending in the direction of the flow transversely to the exhaust pipe (1).

12 Claims, 1 Drawing Sheet

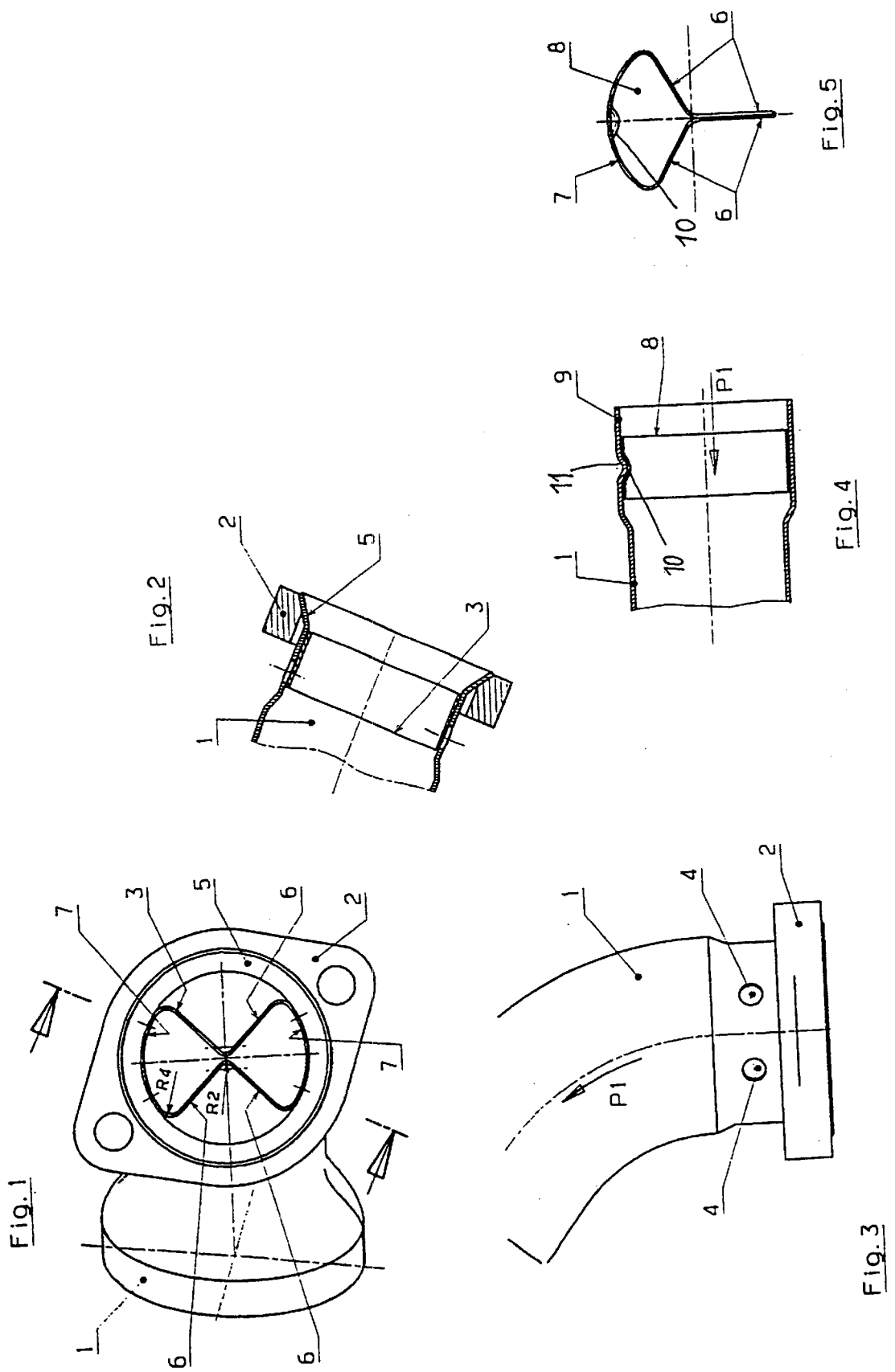

DEVICE FOR STABILIZING THE FLOW IN THE EXHAUST LINE OF AN INTERNAL COMBUSTION ENGINE

This is a continuation of PCT application Ser. No PCT/EP99/05716 filed on Aug. 7, 1999.

FIELD OF THE INVENTION

The invention relates to a device for stabilizing the flow in the exhaust line of an internal combustion engine, in particular, at the exhaust side exit of an exhaust turbocharger downstream of an internal combustion engine, comprising a guide baffle including a plurality of web plates extending in the direction of flow transversely to the exhaust pipe.

BACKGROUND OF THE INVENTION

In the design of exhaust gas turbochargers two negative effects can frequently be observed. On catalysts close to the engine a poor flow distribution along the end face of the catalyst body occurs, having a particularly negative effect if the engine runs under partial load, because in that situation the exhaust flow is subjected to strong spin effects. This results in a decreased exhaust purification effect of the catalyst.

Particularly in the case of exhaust gas turbochargers of modern design with adjustable guide blades a particularly unpleasant noise formation comparable with a howling noise is experienced in the exhaust train at certain rates of revolution under partial load, which is transmitted all the way to the outlet noise. Although this noise can be muffled in the silencer device, this can be achieved only at substantially increased cost. In certain particularly constricted installation situations an additional problem arises in that for such silencing requirements the additionally needed silencer volume cannot be accommodated below the vehicle floor.

U.S. Pat. No. 4,529,356 A discloses a device of the type set out in the introduction. In that case the exhaust turbocharger of a turbocharged internal combustion engine is followed downstream by a slightly conically diverging casing, a guide baffle comprising eight radially extending web plates being provided in the region of maximum flow cross-section.

SUMMARY OF THE INVENTION

It is an object of the present invention to provide a device of the type set out in the introduction which can be manufactured at minimum cost, the device preferably requiring no additional installation space for flow stabilization and wherein the aforesaid two disadvantages associated with the provision of an exhaust turbocharger are substantially avoided.

According to the invention, this object is attained by a device in accordance with claim 1. The device according to the invention for flow stabilization is accordingly characterized in that the guide baffle is manufactured by squeezing or pressure-deforming a sheet metal ring. The sheet metal ring may in this context more particularly be formed by a thin-walled pipe section. The deformation of the sheet metal ring proceeds preferably in such a manner that the web plates do not enter into mutual contact but at the most approximate each other to within a narrow gap width.

With such a simple device which preferably is installed directly onto the outlet of the exhaust turbocharger, it was surprisingly possible not only to attain the desired even flow at the inlet into the catalyst, but also to bring about the desired silencing effect. Thus in the measured problematic frequency range a silencing effect of 12 dB was attained, which, in total, i.e. when measured over all frequencies amounts to an actual drop of 8 dB. If one were instead to operate with a conventional stabilizer, composed e.g. of a plurality of small tubes, the same effect would only be attainable at higher cost and increased length of the structure; without such a stabilizer one would require a straight pipe length corresponding approximately in length to ten times the pipe diameter of the exhaust pipe.

By way of contrast according to the solution proposed by the invention, the web plates only extend over a short length of the exhaust pipe, an axial length of the web plates being, for example, sufficient which is less than the radius of the exhaust pipe.

The guide baffle according to the invention is composed essentially of web plates of essentially radial orientation as well as one or more peripheral sheets to which the web plates are connected at their ends facing the tube wall; the peripheral sheets in turn are fitted to the tube wall, e.g. by welding or press-fitting into the exhaust pipe. The seating of the guide baffle in the exhaust pipe may be secured by interlocking the exhaust pipe with the peripheral sheet of the guide baffle, e.g. by the pressing of catches into the exhaust pipe, which interengage with matching catches of the peripheral sheets.

The web plates of the guide baffle are so designed that they extend essentially radially or essentially rectilinearly when viewed through the exhaust pipe in cross-section. The web plates may be provided in optional even numbers; however, an uneven number may also be found advantageous, e.g. in the form of three web plates in a Y-pattern. In practice, a guide baffle in the form of a pinched "8", and thus comprising four radially extending web plates and two peripheral sheets connected there between was found to be advantageous.

Due to the fact that the transitional region between peripheral sheets and web plates in the aforesaid embodiment defines a radius, the trend of the web plates not to interengage is further increased since the radius increases with rising temperature in the sense of a leveling of the bend, whereby the web plates are drawn apart. Possible thermal stresses and resulting crack formations are counteracted due to the web plates not being in contact with one another, i.e. the life expectancy of the guide baffle corresponds to that of the entire exhaust train.

The guide baffle according to the invention is preferably fitted directly to the outlet of the exhaust turbocharger, preferably so close thereto that the guide baffle is closer to the outlet cross-section of the turbocharger than corresponds to the axial length of the web plates.

The guide baffle according to the invention may also be fitted at locations of the exhaust pipe of a motor vehicle or of an internal combustion engine other than between the exhaust turbocharger and the inlet of the catalyst, i.e. wherever a flow stabilization may be necessary. However, it was found in practice that contrary to conventional theories of aerodynamics the afore explained small length of the guide baffle in the direction of flow is adequate.

BRIEF DESCRIPTION OF THE DRAWINGS

In the following an embodiment of the device according to the invention will be further explained with reference to the drawing. There is shown in

DETAILED DESCRIPTION OF THE PREFERRED EMBODIMENTS

FIG. 1 an end view of the flange of the exhaust pipe directed towards the turbo charger, FIG. 2 a section along II—II of FIG. 1, FIG. 3 a plan view onto the view according to FIG. 1, FIG. 4 an axial partial section through the end of the exhaust pipe accommodating the guide baffle and FIG. 5 a diagrammatic view in cross-section through an embodiment of a guide baffle.

FIGS. 1 to 3 show a section of the exhaust pipe 1 having a flow there through in accordance with arrow P1 in the direction of the not-illustrated catalyst. The exhaust flow according to arrow P1 is derived from the likewise not-illustrated exhaust gas turbocharger, to the outlet of which the flange 2 of the associated end of the exhaust pipe 1 is connected. Partly still within the flange 2 a guide baffle 3 is affixed in the exhaust pipe 1 by spot welds 4. Towards the exhaust turbocharger the exhaust pipe 1 terminates by way of a short flaring portion 5.

The guide baffle 3 has the configuration of an "8", squeezed from both sides, composed of four web plates 6 and two peripheral sheets 7. The guide baffle 3 is affixed in the region of its peripheral sheets 7 to the inner periphery of the exhaust pipe 1, e.g. by being press-fitted there with the exhaust pipe being slightly expanded. Adjoining web plates 6 are at an angle to one another of 90°. In the transition region from the web plates 6 to the peripheral sheets 7 the guide baffle has a rounded configuration in accordance with radius R4; towards the center as well the adjoining web plates 6 adjoin one another by way of a radius R2. Both radii R2, R4 tend to level out under heat action, i.e. the web plates 6 move apart in the center point region, thereby forming a narrow gap. Due to the web plates 6 not being in contact, any friction or stressing is avoided there, which has a favorable effect on the service life of the guide baffle 3.

As an alternative to the flattened "8" according to FIGS. 1 to 3, FIG. 5 illustrates an approximately mushroom-shaped cross-sectional configuration of a guide baffle 8, likewise comprising four web plates 6 of which two are in close contact with one another, jointly forming in a sense the thin stalk of the mushroom shape; the cap thereof is formed by a peripheral sheet 7. According to FIG. 5 a cross-sectional configuration of a guide baffle 8 is created which effectively comprises three web plates only, because of the four web plates two are in very close contact with one another.

FIG. 4, viewed with FIG. 5 shows a corresponding installation situation of the guide baffle 8 in the interior of an expanded terminal section 9 of the exhaust pipe 1. The guide baffle 8 is positionally secured by notches 10 into which engage matching notches 11 of the exhaust pipe 1. According to FIG. 4 the connecting flange to the exhaust turbocharger has been omitted. From the latter the exhaust gas flows according to arrow P1 towards the catalyst. In the region of the guide baffle 8 the exhaust gas flow is stabilized, i.e. rendered uniform, thereby to impact the end face of the catalyst body uniformly distributed. It is clearly apparent from FIG. 4 that the guide baffle 8 is accommodated very closely to the outlet of the turbocharger, the outlet aperture of which corresponds to the right hand side end of the exhaust pipe 1. Accordingly, the distance of the guide baffle 8 from the outlet cross-section of the turbocharger amounts to less than the axial reach of the guide baffle 8.

What is claimed is:

1. A device for stabilizing the flow in the exhaust line of an internal combustion engine at the exhaust side exit of an exhaust turbocharger downstream of an internal combustion engine, comprising:

a guide baffle having a plurality of web plates extending in the direction of flow transversely to the exhaust pipe and connected by at least one peripheral sheet extending along the periphery of the exhaust pipe, wherein the guide baffle is a sheet metal ring squeezed along a central portion thereof.

2. The device according to claim 1, wherein the plurality of web plates extend essentially radially.

3. The device according to claim 1, wherein the plurality of web plates at their ends facing the pipe wall, are connected to one or more peripheral sheets affixed to the pipe wall.

4. The device according to claim 1, wherein the plurality of web plates extend over a short distance longitudinally to the exhaust pipe.

5. The device according to claim 4, wherein the axial length of the plurality of web plates is less than the radius of the exhaust pipe.

6. The device according to claim 1, wherein the guide baffle is fitted closer to the outlet of the exhaust turbocharger than the axial length of the plurality of web plates.

7. The device according to claim 1, wherein the sheet metal ring is formed from a thin-walled pipe section.

8. The device according to claim 1, wherein the plurality of web plates are out of contact with one another.

9. The device according to claim 1, wherein a transitional region between the peripheral sheet and the plurality of web plates defines a radius.

10. The device according to claim 1, wherein the plurality of web plates, viewed in cross-section through the exhaust pipe, extend essentially rectilinearly.

11. The device according to claim 1, wherein the guide baffle is connected to the exhaust pipe by welding or press-fitting.

12. The device according to claim 11, wherein a seating of the guide baffle is secured by interlocking the exhaust pipe with the at least one peripheral sheet of the guide baffle.

* * * * *